United States Patent
Hardt et al.

(10) Patent No.: US 6,176,659 B1
(45) Date of Patent: Jan. 23, 2001

(54) SHEARABLE SCREW

(75) Inventors: Falk Hardt, Munchberg; Volker Markgraf, Roslau, both of (DE)

(73) Assignee: Gerhard Petri GmbH & Co. KG, Hof/Saale (DE)

( * ) Notice: Under 35 U.S.C. 154(b), the term of this patent shall be extended for 0 days.

(21) Appl. No.: 09/375,973

(22) Filed: Aug. 17, 1999

(30) Foreign Application Priority Data

Aug. 18, 1998 (EP) .................................................. 98115536

(51) Int. Cl.⁷ ...................................................... F16B 31/00
(52) U.S. Cl. ................................................. 411/5; 411/393
(58) Field of Search ................ 411/5, 3, 2, 393, 411/410, 1, 4, 8

(56) References Cited

U.S. PATENT DOCUMENTS

| | | | |
|---|---|---|---|
| 3,444,775 | * 5/1969 | Hills | 411/3 |
| 3,512,447 | * 5/1970 | Vaughn | 411/5 |
| 3,963,322 | * 6/1976 | Gryctko | 411/2 |
| 4,504,180 | * 3/1985 | Ishii | 411/5 |
| 5,697,929 | * 12/1997 | Mellinger | 411/5 |

FOREIGN PATENT DOCUMENTS

| | | |
|---|---|---|
| 0634811 A1 | 1/1995 | (EP) . |
| 0692643 A1 | 1/1996 | (EP) . |
| 2140523 | 11/1984 | (GB) . |
| 2281599 | 3/1995 | (GB) . |
| 2299640 | 10/1996 | (GB) . |

OTHER PUBLICATIONS

European Search Report dated Jan. 11, 1999.

* cited by examiner

*Primary Examiner*—Flemming Saether
(74) *Attorney, Agent, or Firm*—Gardner, Carton & Douglas

(57) ABSTRACT

The present invention relates to a tear-off cap or shearable screw (1) comprising a plurality of thread portions (3) and a cap portion (5) connected with the thread portions (3) via a first predetermined breaking point (7), wherein further predetermined breaking points (9) in the form of cross-section tapering are provided between the thread portions (3). The present invention distinguishes itself by the fact that the tear-off torques both increase and decrease from the most remote thread portion towards the cap portion (5), this forming at least one stepped predetermined breaking point (13).

5 Claims, 3 Drawing Sheets

SHEARABLE SCREW

BACKGROUND OF THE INVENTION

The present invention relates to a tear-off cap or shearable screw.

For connecting, branching off and plugging of cables, in particular underground cables, screw connectors, cable connecting clamps or cable lugs are conventionally used, into which tear-off cap screws are inserted for fixing or contacting of the conductors, respectively.

WO 96/31706 discloses a shearable screw comprising a plurality of thread portions and a cap portion connected with the thread portions by means of a predetermined breaking point, wherein further predetermined breaking points in the form of cross-section tapering are provided between the thread portions. The predetermined breaking points are configured such that the predetermined breaking point being most remote from the cap features the largest cross-section tapering, whereas the point being closest to the cap features the slightest cross-section tapering or cutting depth. Due to this configuration, a tear-off torque results which always increases from the thread portion that is most remote from the cap portion towards the cap portion.

A plurality of disadvantages are, however, entailed therewith. The less the shearable screw penetrates the cable connector to clamp the conductor inserted therein, the less is the corresponding tear-off torque, i.e. correspondingly less is the force acting thereagainst. This means that the least pressing force is available for the largest conductors and the strongest pressing force is available for the smallest conductors. In the one case, namely that of the least pressing force, there is the risk that the conductor will not be clamped sufficiently and thus the danger of lacking contact, whereas in the other extreme case, i.e. the smallest conductor with strongest pressing force, a squeezing of the smallest conductor may be possible, which may result in the failure of the cable connection.

A similar shearable screw is known from EP 0 692 643 A1, where the tear-off torques of all predetermined breaking points are to increase or decrease from the cap portion towards the last or front thread portion, respectively. Possibly they are, however, substantially equal. In the case of decreasing, the afore-mentioned disadvantages result. In the case of increasing, there is the risk of the tear-off cap screw to tear off before the tear-off torque required for the respective conductor has been reached, and this does not only result in a possibly insufficient clamping of the conductor, but also entails a very disadvantageous projecting of the broken remaining portion of the tear-off cap screw from the outer contour of the cable clamp.

SUMMARY OF THE INVENTION

It therefore is an object of the present invention to improve a tear-off cap or shearable screw of the kind initially mentioned such that the disadvantages of prior art are overcome and a tear-off cap screw is provided which enables optimal clamping and tearing off for a plurality of different cross-sections of cable conductors.

The present invention is directed towards a shearable screw comprising a plurality of thread portions and a cap portion connected to the thread portions via a first predetermined breaking point, wherein further predetermined breaking points in the form of cross-section tapering are provided between the thread portions. The tear-off torques both increase and decrease from the most remote thread portion towards the cap portion, thereby forming at least one stepped predetermined breaking point.

Due to the fact that the tear-off torques both increase and decrease from the most remote thread portion towards the cap portion, this forming at least one stepped predetermined breaking point, it is achieved that safe tearing off at the desired position is ensured on the one hand and too high torques are avoided with small conductor cross-sections on the other hand.

Advantageously, the tear-off cap screw is configured such that the tear-off torque of the stepped predetermined breaking point is smaller than that of the following predetermined breaking point located at a more remote position from the head. This ensures that the tightening moment during the further screwing in of the tear-off cap screw becomes smaller, and thus a smaller conductor is not compressed even stronger than the correspondingly larger conductor. Advantageously, the tear-off torque then increases again from predetermined breaking point to predetermined breaking point from the stepped predetermined breaking point towards the cap portion, so that the perfect functioning of the tear-off cap screw is guaranteed.

In accordance with the invention, a different tool engages at the stepped predetermined breaking point than engages at the thread portions that are more remote from the stepped predetermined braking point away from the cap portion. This ensures the correct engagement for tearing off at the correct predetermined breaking point.

Preferably, the cap portion comprises a hexagon insert bit as tool engagement face, and an inner excess, for instance a hexagon socket or Torx, etc. is provided which extends from the cap portion to the thread portion below the stepped predetermined breaking point. This ensures that the tool introduced into the inner excess produces the tear-off torque for the predetermined breaking points below the stepped predetermined breaking point, whereas for the predetermined breaking points positioned above, the cap portion produces the tear-off torque.

With a particular advantage, a corresponding adaptation to the various conductor cross-sections can additionally be achieved by the fact that the height of the thread portions is optional. Correspondingly flexibly and exactly can the tear-off cap screw be adapted with its predetermined breaking points to the cross-sections of the cable conductors which, according to standardization, do not alter continuously, but step-wise.

Another advantage of the present invention results from the fact that the tear-off cap screw comprises 3 to 10, preferably 4 to 8 predetermined breaking points, at least one of which is configured as stepped predetermined breaking point. This advantageously provides for the considerable flexibility and adaptability of the tear-off cap screw to the most various fields of application, in particular to the most various conductor cross-sections that can be clamped safely by means of the tear-off cap screw according to the invention, and the tear-off cap tears off at the correct predetermined breaking point.

Further details, features and advantages of the invention result from the following description making reference to the drawings.

DETAILED DESCRIPTION OF THE INVENTION

Figure 1:
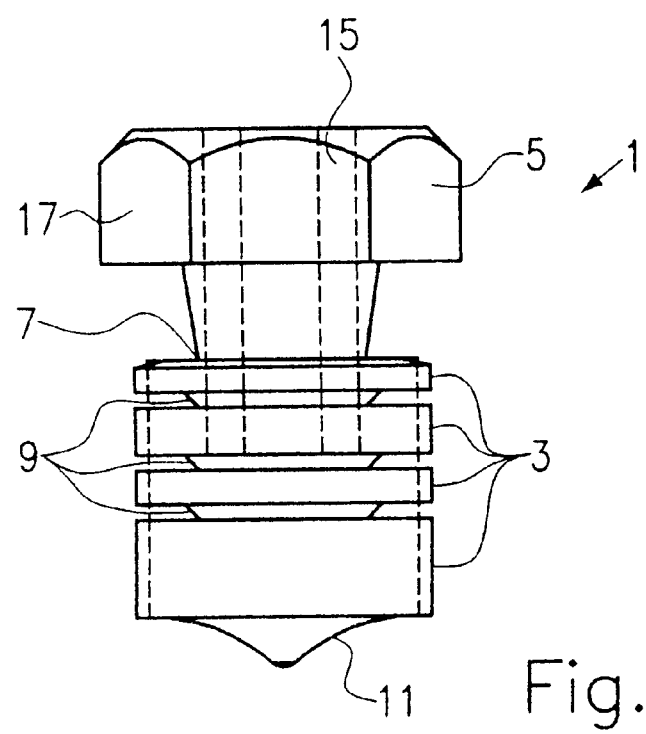
FIG. 1 shows a lateral view of a first embodiment of the tear-off cap screw according to the invention.
Figure 2:
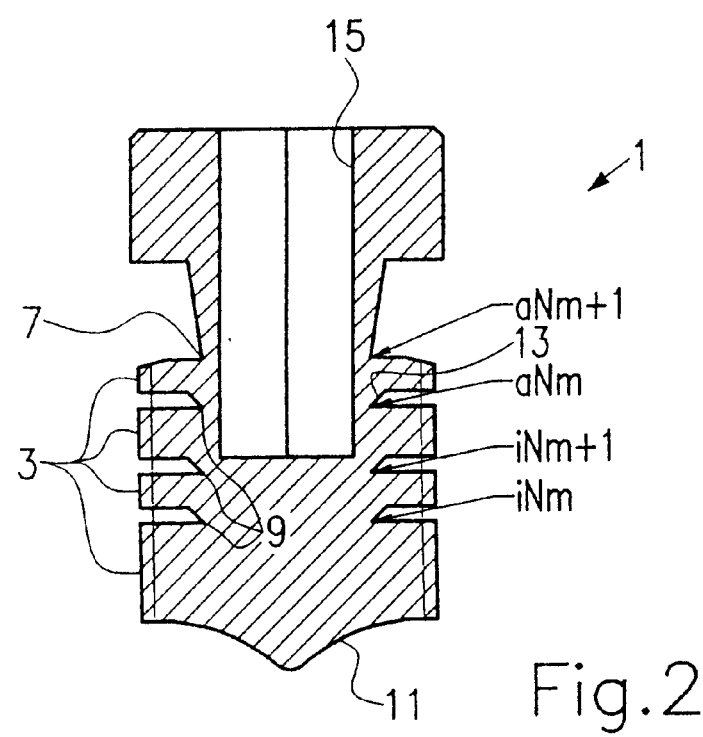
FIG. 2 shows a sectional view through the tear-off cap screw of FIG. 1.

FIGS. 1 and 2 illustrate a first embodiment of the tear-off cap screw according to the invention. The tear-off cap screw 1 comprises a plurality of thread portions 3 and a cap portion 5. Between the cap portion 5 and the closest thread portion 3 a first predetermined breaking point 7 is provided. Between the thread portions 3, further predetermined breaking points 9 are provided.

As may be gathered, the thread portions 3 may be of varying height or strength, respectively. The lowest thread portion furthermore comprises a cable contacting face 11 which then effects the clamping when the tear-off cap screw has been screwed in.

The construction of the predetermined breaking point results particularly clearly from FIG. 2. As shown, the tear-off torques iNm, iNm+1, aNm and aNm+1 result at the individual predetermined breaking points 9 or the first predetermined breaking point 7, respectively. The arrangement has to be understood such that the "+1" indicates that this tear-off torque increases as compared to or is larger than the previous tear-off torque, respectively.

The predetermined breaking point having the torque aNm also may be referred to as stepped predetermined breaking point 13. The tear-off torque aNm is reduced as compared to the previous tear-off torque iNm+1.

As may furthermore be gathered, an inner excess 15, for instance a hexagon socket recess, extends through the cap portion to the thread portion 3 positioned below the stepped predetermined breaking point 13. Towards the cap portion 5, the torque then increases again in the predetermined breaking point 7.

As may furthermore be gathered, the cap portion 5 comprises another tool engaging face 17 in the form of a hexagon insert bit.

According to the illustration of FIG. 2 it thus results that the predetermined breaking points having the torques "i" are torn off by means of the inner excess, whereas the predetermined breaking points having the tear-off torque "a" can be torn off with the hexagon insert bit 17.

Figure 3:
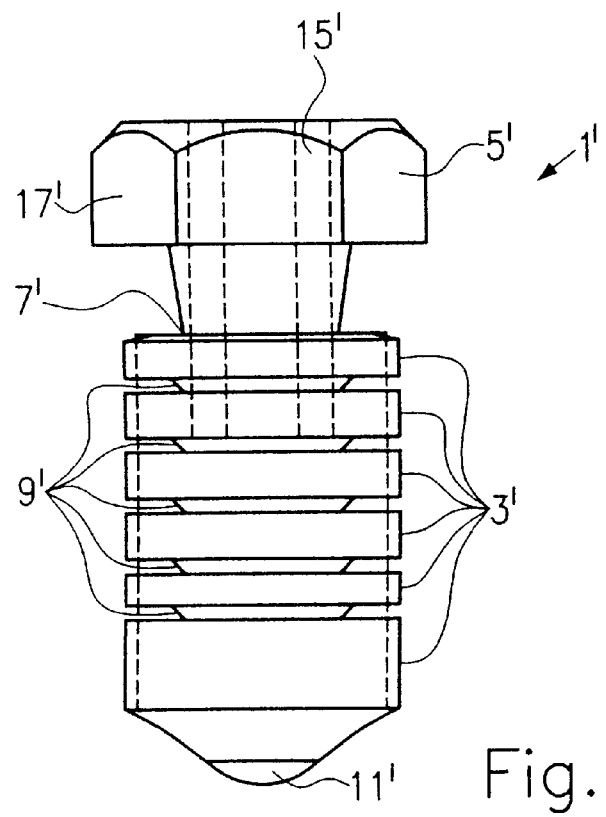
FIG. 3 shows a second embodiment of the tear-off cap screw according to the invention in lateral view.
Figure 4:
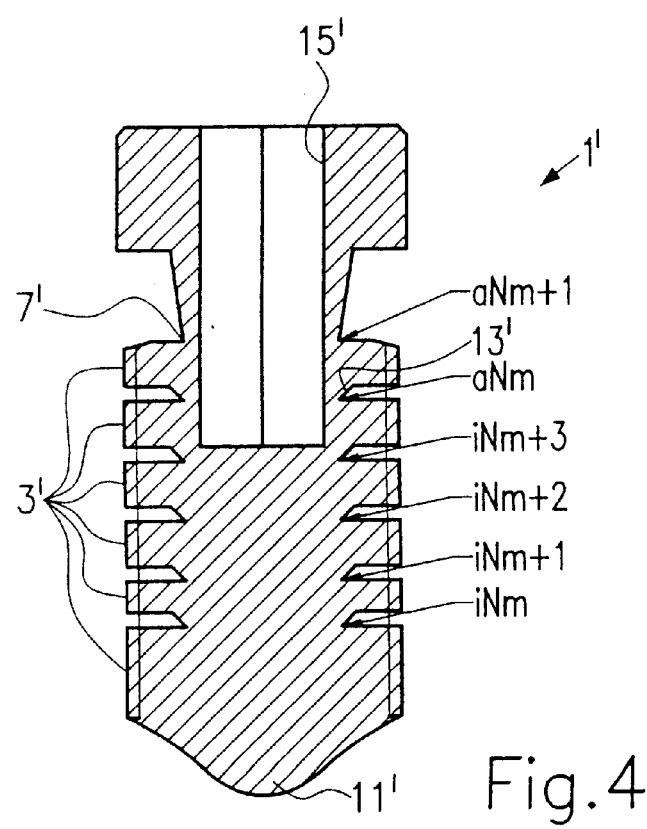
FIG. 4 shows a sectional view through the tear-off cap screw of FIG. 3.

In FIGS. 3 and 4, a second embodiment of the tear-off cap screw according to the invention is shown. The elements corresponding to the elements of FIGS. 1 and 2 have been provided with the addition "'". The embodiment according to FIGS. 3 and 4 comprises six predetermined breaking points, a first one 7' and five other ones 9', one of which is the stepped predetermined breaking point 13'. The four lower ones of the six predetermined breaking points are operated by means of the hexagon socket 15', and the two upper predetermined breaking points are operated with the hexagon insert bit 17'.

Figure 5:
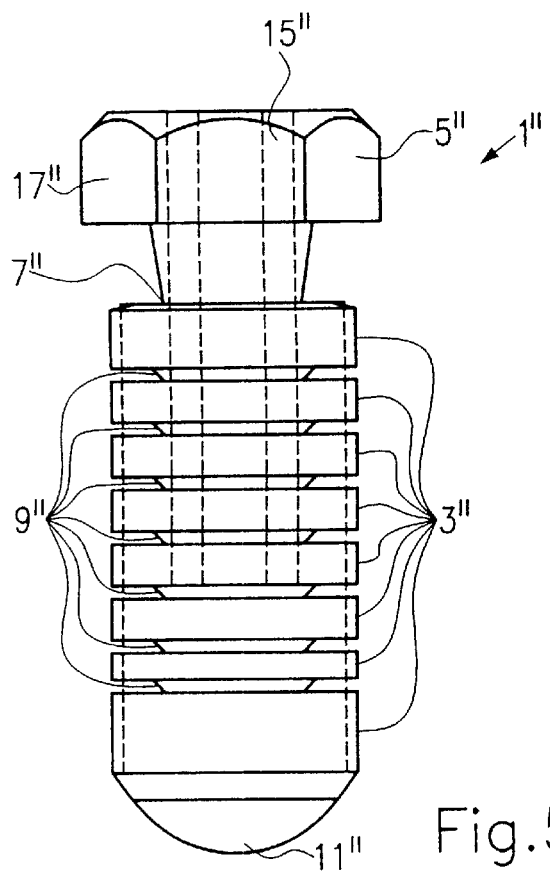
FIG. 5 shows a third embodiment of the tear-off cap screw according to the invention in lateral view.
Figure 6:
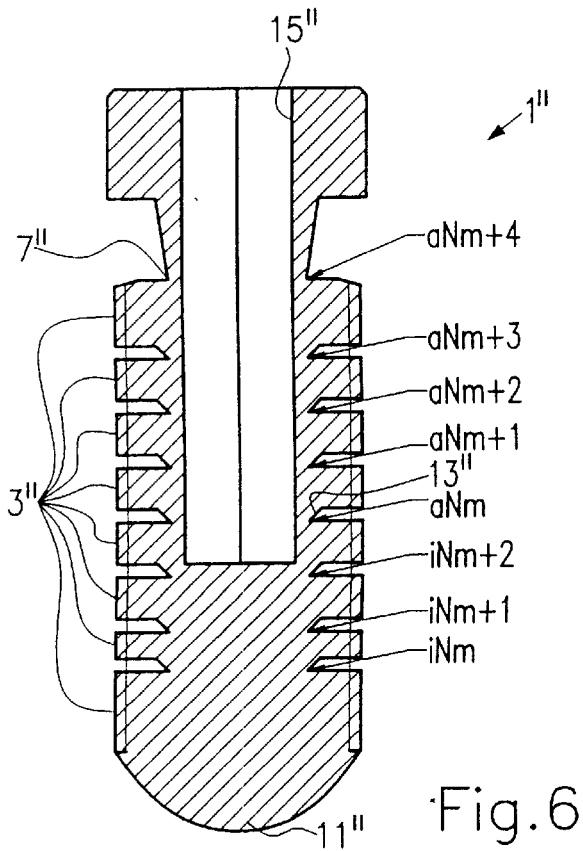
FIG. 6 shows a sectional view through the tear-off cap screw of FIG. 5.

In FIGS. 5 and 6, a third embodiment of the tear-off cap screw 1" according to the invention is shown. Elements equal to the preceding ones have been referred to with the addition "''". The tear-off cap screw 1" comprises eight predetermined breaking points and correspondingly eight thread portions 3". As may be gathered, the heights or thicknesses, respectively, of the thread portions 3" are distinctly different from each other.

Three of the predetermined breaking points are operated by means of the hexagon socket 15", whereas five of the predetermined breaking points are operated by means of the hexagon insert bit 17".

This shows that a very varying arrangement of the predetermined breaking points is possible, i.e. the stepped predetermined breaking point may be provided at the most varying predetermined breaking points.

The present invention is not restricted to the embodiments shown. Several stepped predetermined breaking points may for instance be provided, the tear-off torque of the stepped predetermined breaking point that is more remote from the cap portion being larger than that of the stepped predetermined breaking point being closer to the cap portion.

What is claimed is:

1. A shearable screw comprising a plurality of thread portions and a cap portion being connected to the thread portions via a first predetermined breaking point, wherein further predetermined breaking points in the form of cross-section tapering are provided between the thread portions, wherein each of said predetermined breaking points has a predetermined tear-off torque depending on the diameter of remaining material in the cross-section tapering, and wherein at least one stepped predetermined breaking point is formed, having a tear-off torque smaller than that of the following predetermined breaking point, said following predetermined breaking point being more remote from said cap portion, and wherein the tear-off torque of the following predetermined breaking point closer to said cap portion increases relative to the tear-off torque of said stepped predetermined breaking point.

2. The shearable screw according to claim 1 wherein a first tool is utilized for engaging at said stepped predetermined breaking point, and a second tool is utilized for engaging at the thread portions more remote from said cap portion.

3. The shearable screw according to claim 1, wherein said cap portion comprises a tool engaging face, and wherein an inner recess, is provided which extends from said cap portion to the thread portion below said stepped predetermined breaking point.

4. The shearable screw according to claim 1, wherein the height of said thread portions is variable.

5. The shearable screw according to claim 1, further comprising between three to about ten predetermined breaking points, at least one of which is configured as a stepped predetermined breaking point.

* * * * *